United States Patent
Dey et al.

(10) Patent No.: US 11,922,134 B2
(45) Date of Patent: Mar. 5, 2024

(54) PHYSICS INFORMED NEURAL NETWORK FOR LEARNING NON-EUCLIDEAN DYNAMICS IN ELECTRO-MECHANICAL SYSTEMS FOR SYNTHESIZING ENERGY-BASED CONTROLLERS

(71) Applicant: Siemens Aktiengesellschaft, Munich (DE)

(72) Inventors: Biswadip Dey, Plainsboro, NJ (US); Yaofeng Zhong, West Windsor, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 833 days.

(21) Appl. No.: 17/005,631

(22) Filed: Aug. 28, 2020

(65) Prior Publication Data
US 2021/0089275 A1    Mar. 25, 2021

Related U.S. Application Data

(60) Provisional application No. 62/905,603, filed on Sep. 25, 2019.

(51) Int. Cl.
| | |
|---|---|
| *G06N 3/08* | (2023.01) |
| *G06F 7/64* | (2006.01) |
| *G06N 3/04* | (2023.01) |
| *G06N 3/045* | (2023.01) |

(52) U.S. Cl.
CPC .............. *G06F 7/64* (2013.01); *G06N 3/045* (2023.01); *G06N 3/08* (2013.01)

(58) Field of Classification Search
CPC ...... G06N 3/08; G06F 7/64; G06J 1/00; G06J 1/005; G06J 1/02
See application file for complete search history.

(56) References Cited

U.S. PATENT DOCUMENTS

| | | | | |
|---|---|---|---|---|
| 5,943,660 | A * | 8/1999 | Yesildirek | G05B 13/027 706/15 |
| 11,531,902 | B2 * | 12/2022 | Horesh | G06N 3/126 |
| 2019/0050370 | A1 * | 2/2019 | Parra Vilchis | B64C 39/024 |
| 2019/0156197 | A1 * | 5/2019 | Dasgupta | G06N 3/08 |
| 2019/0378008 | A1 * | 12/2019 | Markram | G06N 3/044 |
| 2020/0233920 | A1 * | 7/2020 | Meeds | G06V 20/698 |
| 2020/0250493 | A1 * | 8/2020 | Simmons-Edler | G06F 18/256 |

OTHER PUBLICATIONS

Ayed et al, "Learning Dynamical Systems from Partial Observations", Feb. 26, 2019, pp. 1-16 (Year: 2019).*

(Continued)

*Primary Examiner* — Paulinho E Smith

(57) ABSTRACT

System and method for synthesizing a controller for a dynamical system includes a feeder neural network trained to estimate an ordinary differential equation (ODE) from time series training data (X) of a trajectory having embedded angular data and configured to learn dynamics of a physical system by encoding a generalization of a Hamiltonian representation of the dynamics using a constant external control term (u). A neural ODE solver receives the estimate of the ODE from the feeder neural network and synthesizes a controller to control the system to track a reference configuration.

12 Claims, 8 Drawing Sheets

(56) References Cited

OTHER PUBLICATIONS

Chang et al., "The Equivalence of Controlled Lagrangian and Controlled Hamiltonian Systems", Jun. 2002, vol. 8, pp. 393-422. (Year: 2002).*
Ayed, Ibrahim et al "Leaning dynamical systems from partial observations" arXiv: 1902.11136, 2019.
Baxter, Jonathan. "A model of inductive bias learning." Journal of Artificial Intelligence Research, 12:149-198, 2000.
Bloch, Anthony M. et al. "Controlled Lagrangians and the stabilization of Euler-Poincar'e mechanical systems." International Journal of Robust and Nonlinear Control, 11(3):191-214, 2001.
Brockman, Greg et al. "OpenAI Gym". arXiv:1606.01540, 2016.
Byravan, Arunkumar and Fox, Dieter. "Se3-nets: Learning rigid body motion using deep neural networks." In 2017 IEEE International Conference on Robotics and Automation (ICRA), pp. 173-180. IEEE, 2017.
Chang, Dong E. et al. "The equivalence of controlled Lagrangian and controlled Hamiltonian systems." ESAIM: Control, Optimisation and Calculus of Variations, 8:393-422, 2002.
Chen, Tian Q. et al. "Neural ordinary differential equations. In Advances in Neural Information Processing Systems" 31, pp. 6571-6583. 2018.
Devlin, Jacob et al, "BERT: Pre-training of Deep Didirectional Transformers for Language Understanding" NAACL 2019.
Goodfellow, Ian et al.: "Deep Learning"; Overview; MIT Press; 2016; ISBN: 9780262337434; accessible online at: http://www.deeplearningbook.org/.
Greydanus, Sam et al. "Hamiltonian Neural Networks." arXiv:1906.01563, 2019.
Gupta, Jayesh K. et al. "A general framework for structured learning of mechanical systems." arXiv:1902.08705, 2019.
Haussler, David. "Quantifying inductive bias: AI learning algorithms and Valiant's learning framework." Artificial Intelligence, 36(2):177-221, 1988.
He, Kaiming, et al. "Deep Residual Learning for Image Recognition" Proceedings of the IEEE Conference on Computer Vision and Pattern Recognition, pp. 770-778, 2016.
Karl, Maximilian et al. "Deep variational Bayes filters: Unsupervised learning of state space models from raw data." arXiv:1605.06432, 2016.
Kingma, Diederik P. et al. "A Method for Stochastic Optimization" San Diego, arXiv:1412.6980 2014.
Krishnan, Rahul G. et al. "Structured inference networks for nonlinear state space models." In Thirty-First AAAI Conference on Artificial Intelligence, 2017.
Lillicrap, Timothy P. et al. "Continuous control with deep reinforcement learning." arXiv:1509.02971, 2015.
Lutter, M. et al. (2019). "Deep Lagrangian Networks: Using Physics as Model Prior for Deep Learning", ICLR 2019.
Narendra, Kumpati S. "Identification and control of dynamical systems using neural networks." IEEE Transactions on Neural Networks, 1(1):4-27, 1990.
Ortega, Romeo et al. "Interconnection and damping assignment passivity-based control of port-controlled Hamiltonian systems." Automatica, 38(4):585-596, 2002.
Ortega, Romeo et al. "Putting energy back in control." IEEE Control Systems Magazine, 21(2):18-33, 2001.
Rowe, David J. et al. "Many-body quantum mechanics as a symplectic dynamical system." Physical Review A, 22(6):2362, 1980.
Sanchez-Gonzalez, Alvaro et al, "Graph networks as learnable physics engines for inference and control." In International Conference on Machine Learning (ICML), pp. 4467-4476, 2018.
Silver, David et al, "Mastering the game of Go without Human Knowledge", Nature, vol. 550, MacMillan Publishers Limited, Oct. 19, 2017, 18 pp.
Watter, Manuel et al. "Embed to control: A locally linear latent dynamics model for control from raw images." In Advances in Neural Information Processing 29, pp. 2746-2754, 2015.
Wei, Tianshu et al: "Deep Reinforcement Learning for Building HVAC Control", Jun. 18, 2017; Jun. 18, 2017-Jun. 22, 2017, Jun. 18, 2017 (Jun. 18, 2017), pp. 1-6, XP058367779, DOI: 10.1145/3061639.3062224; ISBN: 978-1-4503-4927-7 / Jun. 18, 2017.

* cited by examiner

PHYSICS INFORMED NEURAL NETWORK FOR LEARNING NON-EUCLIDEAN DYNAMICS IN ELECTRO-MECHANICAL SYSTEMS FOR SYNTHESIZING ENERGY-BASED CONTROLLERS

TECHNICAL FIELD

This application relates to machine learning. More particularly, this application relates to applying a machine learning framework to learn system dynamics in complex electro-mechanical systems to synthesize a controller.

BACKGROUND

A large class of real-world applications, such as controlling power-flow in smart-grids or designing end-effector paths (trajectories) for industrial robots on a factory floor, can reap benefit from learning the underlying dynamics represented via a latent space representation. Such insight enables implementation of effective control loops with assurances on desired behavior as well as pave the way for model-based approaches to safe reinforcement learning.

A broader class of physics-informed machine learning problems focuses on infusing physics-based domain knowledge to design efficient neural networks. For example, Lagrangian mechanics have been leveraged in prior works to learn the dynamics of kinematic structures from time-series data of position, velocity, and acceleration. Another work uses Hamiltonian mechanics to learn the dynamics of autonomous, energy-conserved mechanical systems from time-series data of position, momentum, and their derivatives. However, these techniques require access to higher-order derivatives of the state variables and also make restrictive assumptions on energy conservation. Also, computing higher-order derivatives, due to associated noise-amplification aspect, may not be desirable in many applications. Thus, it may not be feasible to employ these machine learning solutions to learn dynamics of real-world physical systems.

Prior works also use neural networks to identify efficient control policies for dynamical systems. However, this body of work, while attempting to leverage state-space models, does not take physics-based priors into consideration.

SUMMARY

This disclosure introduces a system and method to learn dynamic models of complex, electro-mechanical systems with differentiable programming and physics-informed machine learning. A machine learning (ML) system leverages a framework of neural ODE solvers capable of learning structured dynamics for a system with embedded non-Euclidean (angular) coordinates. Training and performance error of the disclosed framework outperforms baseline model approaches while using smaller training datasets.

In an aspect, a system of neural networks for synthesizing a controller includes a processor and a non-transitory memory having stored modules executed by the processor. A feeder neural network module is trained to estimate an ordinary differential equation (ODE) from time series training data (X) of a trajectory having embedded angular data, and configured to learn dynamics of a physical system by encoding a generalization of a Hamiltonian representation of the dynamics using a constant external control term (u) for driving parameter learning in the feeder neural network. A neural ordinary differential equation (ODE) solver module is configured to receive the estimate of the ODE from the feeder neural network, and to synthesize a controller to control the system to track a reference configuration.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed for a neural ordinary differential equation (ODE) solver to learn state-space models by incorporation of a control term into the dynamics of a system to be controlled such that system dynamics can be learned in an efficient way. Neural network architectures are disclosed which approximate an ODE function for feeding to the neural ODE solver. These feeder neural networks are constructed in a way to enable training with data having embedded angular data, which is a novel feature since neural ODE solvers cannot directly receive data input in such form as the domain and range have different dimensions. The novel feeder neural network can model dynamical systems having different forms of trajectory data and state variables, such as (1) generalized coordinate and momentum, (2) embedded angular data, and (3) a hybrid version that includes both forms (1) and (2), giving a flexible solution to the technical problem of controller synthesis.

The neural ODE solver is useful for synthesis of a controller for a dynamic system, such as a fully actuated robot having multiple degrees of freedom. Consider a task of controlling each joint of a robotic arm with multiple joints using actuators at each joint, each joint a single degree of freedom of either translational motion or rotational motion.

Given a set of coordinates in space at which the robot must trace a trajectory, an objective is to define the function for the trajectory path, and controller instructions for the actuators, which involves ODE operations related to the dynamics of the system. Training the feeder neural network involves learning the dynamics of the system to be controlled. The feeder neural network learns the dynamics by applying principles of a Hamiltonian function representation of phase space to predict a trajectory of a reference coordinate.

Figure 1:
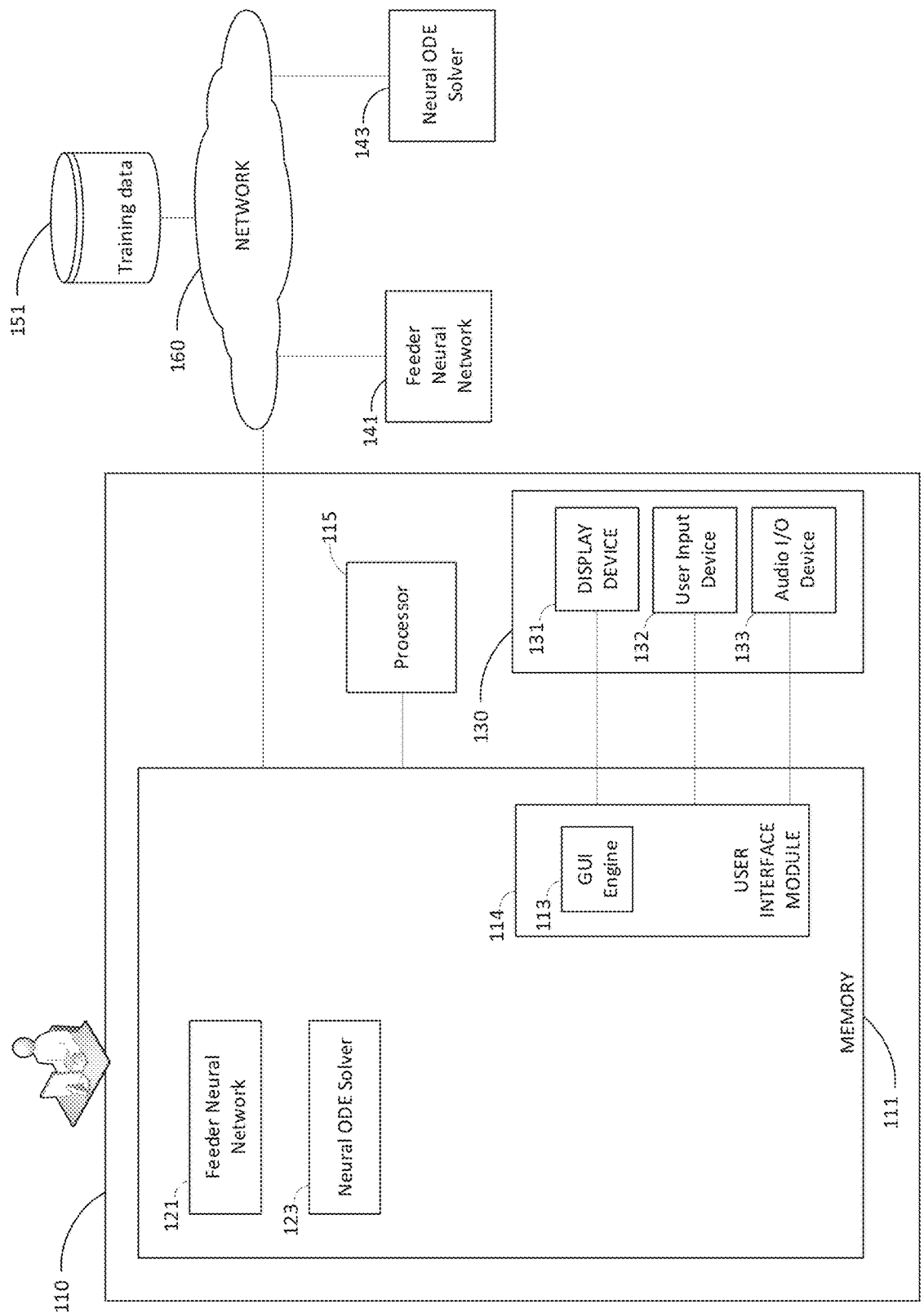
FIG. 1 shows an example of a deep learning framework to infer dynamics of a physical system in accordance with embodiments of this disclosure.

FIG. 1 shows an example of a deep learning framework to infer dynamics of a physical system in accordance with embodiments of this disclosure. A computing device 110 includes a processor 115 and memory 111 (e.g., a non-transitory computer readable media) on which is stored various computer applications, modules or executable programs. In an embodiment, computing device includes one or more of the following modules: a Feeder Neural Network module 121 and an ODE solver module 123.

As shown in FIG. 1, as an alternative implementation, one or more of a feeder neural network module 141 and ODE solver module 143, may be deployed as cloud-based or web-based operations, or as a divided operation shared by local modules 121, 123 and web-based modules 141, 143, 145. Herein, for simplicity, the configuration and functionality for the feeder neural network module and ODE solver module are described as a local implementation at computing device 110. However, the same configuration and functionality applies to any embodiment implemented by the web-based deployment of modules 141, 143.

A network 160, such as a local area network (LAN), wide area network (WAN), or an internet based network, connects computing device 110 to training data 151.

User interface module 114 provides an interface between modules 121, 123 and user interface 130 devices, such as display device 131 and user input device 132. GUI engine 113 drives the display of an interactive user interface on display device 131, allowing a user to receive visualizations of analysis results and assisting user entry of learning objectives and domain constraints for feeder neural network 121 and ODE solver 123.

In an embodiment, a model is sought for a time evolution of a dynamical system to predict trajectory for a reference configuration point in space. As a first step, the dynamics of a particular system can be learned by Feeder Neural Network 121 as a model based on Hamiltonian dynamics, which is a reformulation of Newtonian dynamics that tracks change of system states according to generalized coordinates in phase space. From the general ODE of $\dot{x}=f(x)$, the Hamiltonian $H(q,p)$ describes a time-evolution of a system using a scalar function of generalized coordinates $q=(q_1, q_2, \ldots, q_n)$ and generalized momenta $p=(p_1, p_2, \ldots p_n)$, where $x=(q, p)$. In an aspect, the framework for this disclosure incorporates an external control parameter u (e.g., force and/or torque) to the Hamiltonian function. As this external control is assumed to be affine and only influences changes in the generalized momenta, this generalization for $\dot{x}$ can be expressed as:

$$\begin{bmatrix} \dot{q} \\ \dot{p} \end{bmatrix} = \begin{bmatrix} \frac{\partial H}{\partial p} \\ -\frac{\partial H}{\partial q} \end{bmatrix} + \begin{bmatrix} 0 \\ g(q) \end{bmatrix} u, \quad \text{Equation (1)}$$

Once the dynamics of the system are learned, the learned model can be used to synthesize a controller for driving the system to a reference configuration $q^*$.

ODE solver 123 may be configured as one or more differentiable ODE solvers with O(1)-memory back-propagation. An objective for a differentiable ODE solver is to learn ODEs from time series data. Consider an ODE: $\dot{x}=f(x)$. Finding the ODE, where an analytical expression for function $f(x)$ is unknown, is a problem to be solved. One solution is to approximate $f(x)$ with a neural network. For time series data $X=(x_{t0}, x_{t1}, \ldots, x_{tn})$, how then could $f(x)$ be learned from the data. Predictions can be made by approximating $f(x)$ using a neural network $f_\theta$ and feeding it into ODE solver 123, which can be expressed as:

$$\hat{x}_{t1}, \hat{x}_{t2}, \ldots, \hat{x}_{tn} = \text{ODESolve}(x_{t0}, f_\theta, t_1, t_2, \ldots, t_n) \quad \text{Equation (2)}$$

The loss function can be constructed as:

$$L = \|X - \hat{X}\|_2^2 \quad \text{Equation (3)}$$

and parameters θ (e.g., weights of neural network connections) can be updated by backpropagating through the ODE solver 123. However, this solution to learn $f_\theta$ is cumbersome to train in practice particularly for long time series (i.e., n is large). If the initial estimate of the $f_\theta$ is poor, the prediction error would in general be large. Although $|x_{t1}-\hat{x}_{tn}|$ might be small, $\hat{x}_{tn}$ would be far from $x_{tn}$ as error accumulates over time, which makes the neural network hard to train. In fact, the prediction error of $\hat{x}_{tn}$ is not as important as $\hat{x}_{t1}$. In other words, data points should be weighted in a short time horizon more than the rest of the data points. In order to address this and better utilize the data, a time horizon τ is introduced as a hyperparameter and predict $x_{ti+1}$, $x_{ti+2}, \ldots, x_{ti+\tau}$ from initial condition $x_{ti}$, where i=(0, \ldots, n-τ). As an additional measure for improved training of the ODE solver 123, Feeder Neural Network 121 is configured as a trainable neural network that models the dynamical system according to a Hamiltonian construct including a control term for the dynamics that drives the parameter θ learning.

Feeder Neural Network 121 incorporates a control term u, hence the ODE function to be learned is reformulated as $\dot{x}=f(x,u)$ with $x=(q,p)$. A function of this form cannot be directly fed into the ODE solver 123 directly since the domain and range of f have different dimensions. In general, if data consists of trajectories of $(x, u)_{t0}, \ldots, _{tn}$ where u remains the same in a trajectory, the augmented dynamics can be leveraged and pressed as follows:

$$\begin{bmatrix} \dot{x} \\ \dot{u} \end{bmatrix} = \begin{bmatrix} f_\theta(x, u) \\ 0 \end{bmatrix} = \tilde{f}_\theta(x, u) \quad \text{Equation (4)}$$

allowing a match of the input and output dimension of $\tilde{f}_\theta$, which enables it to be fed into ODE solver 123. Different constant external forcing is used to get the system responses, and use those system responses can train the model. With a trained model, a time-varying control value u can be applied to the dynamics as $\dot{x}=f_\theta(x,u)$ and to generate estimated trajectories. When synthesizing the controller, u remains constant in each integration step. As long as the model interpolates well among different values of constant u, good estimated trajectories can be obtained with a time-varying u. The problem is then how to design the network architecture of $\tilde{f}_\theta$ or equivalently $f_\theta$ such that the dynamics can be learned in an efficient way.

Figure 2:
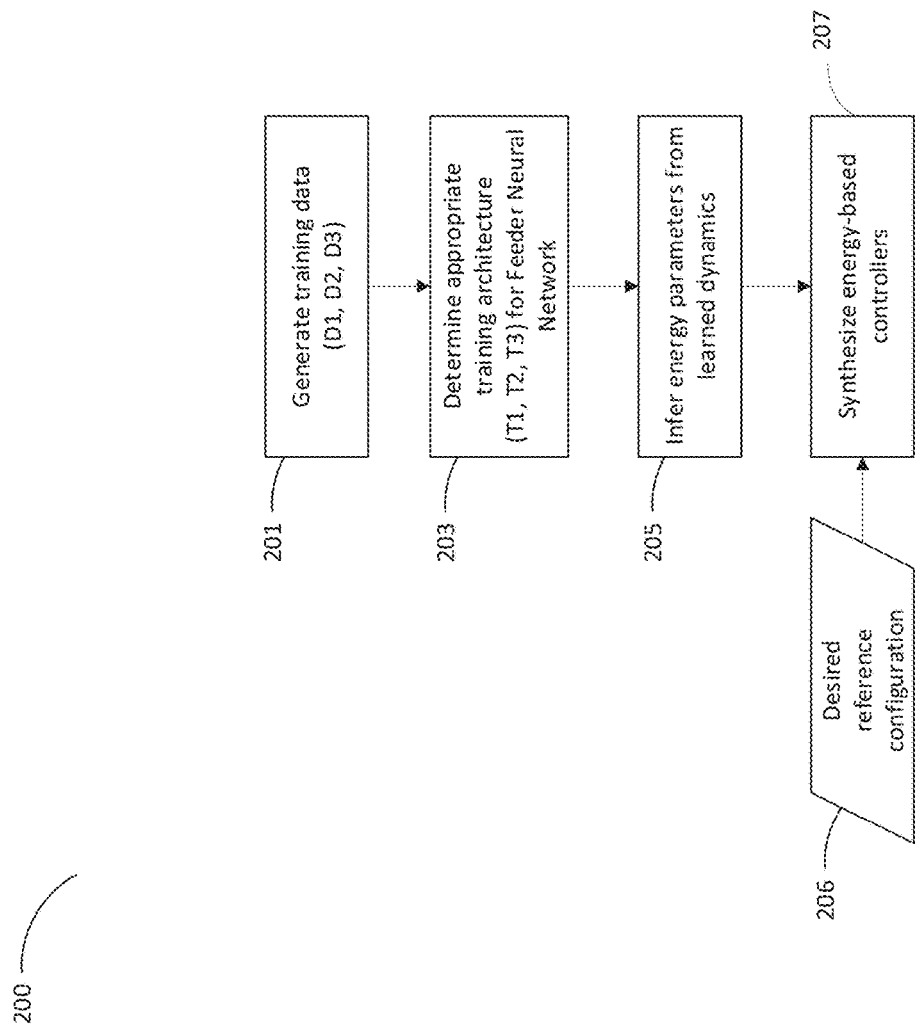
FIG. 2 shows a flowchart example of a process for synthesizing a controller for closed loop control of a dynamic system in accordance with embodiments of this disclosure.

FIG. 2 shows a flowchart example of a process for synthesizing a controller for closed loop control of a dynamic system in accordance with embodiments of this disclosure. In an embodiment, process 200 is performed by the Feeder Neural Network module 121, and ODE solver module 123. At 201, training data for the Feeder Neural Network 121 is generated, further explained with reference to FIG. 3. An appropriate training architecture for function fe of the Feeder Neural Network 121 is determined at 203, depending on the type of dynamical system, further explained with reference to FIG. 4.

At 205, Feeder Neural Network 121 infers energy parameters from the learned dynamics. In an embodiment, energy shaping is incorporated into the controller synthesis by deriving a potential energy shaping function β(q) such that a closed loop system behaves as if its time-evolution is governed by a desired Hamiltonian $H_d$. The shaping function β(q) shapes the potential energy such that the desired Hamiltonian $H_d$(q,p) has a minimum at (q*,0), ensuring that the system has the lowest energy at the desired reference configuration q*. In an embodiment, an additional damping term v(p) ensures that trajectories actually converge to the reference configuration q*. For underactuated systems having at least one passive joint (non-actuated), potential energy shaping alone may not be capable of driving the system to reference configuration q*, and kinetic energy shaping is also performed.

At 207, ODE solver 123 synthesizes an energy-based controller 207 for driving the dynamical system to a desired reference configuration 206 (e.g., the controller is defined to map a predicted time-series trajectory for a multi-jointed robot with translational and rotational movement toward a final destination at reference configuration 206).

Figure 3:
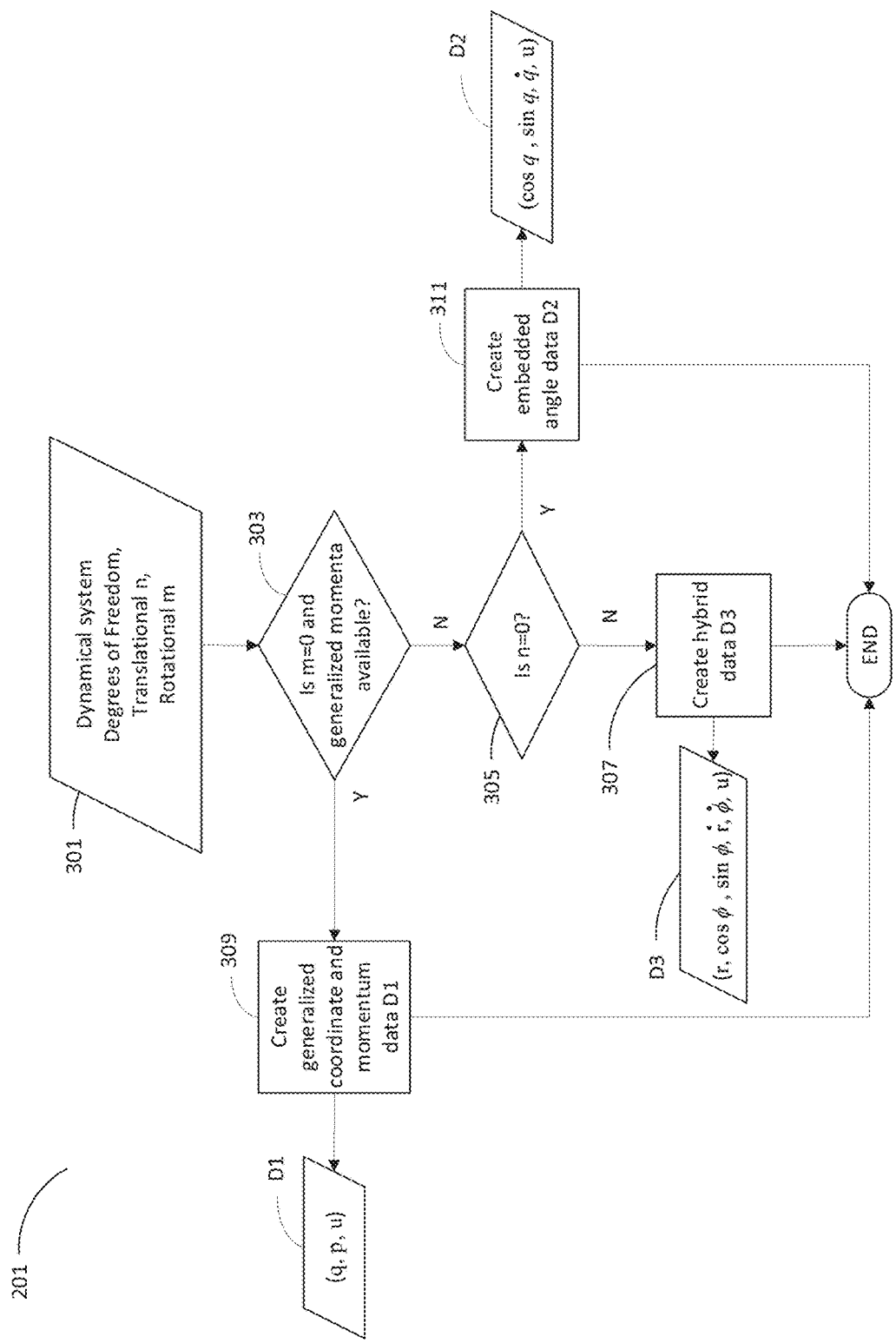
FIG. 3 shows a flowchart example of a process for generating training data within the process of FIG. 2 in accordance with embodiments of this disclosure.

FIG. 3 shows a flowchart example of a process for generating training data within the process of FIG. 2 in accordance with embodiments of this disclosure. Training data for Feeder Neural Network 121 is generated according to process 201. The dynamical system to be modeled has constraint data 301 including degrees of freedom for the system. For example, a robotic arm may have four translational joints (n=4) and two rotational joints (m=2), for a total of six degrees of freedom. If m=0 and generalized momenta p is available at 303, then the dynamical system consists of only translational coordinates, leading to a simpler modeling analysis without angular data. At 309, training dataset D1 is generated consisting of trajectory data in the form of (q,p, u)$_{t0, \ldots, tn}$, where u remains constant in a trajectory. If m>0 at 303, the dynamical system has rotational aspects, and trajectory training data will need some form of embedded angular data. At 305, if n=0, then only rotational aspects are present in the dynamical system, and trajectory data for a training dataset D2 in the form (cos q, sin q, q̇, u) is generated to include embedded angular data at 311. If at 305 n>0, then both forms of motion n and m are present, and a hybrid training dataset D3 in the form (r, cos φ, sin φ, ṙ, φ̇, u) is generated at 307, where q̇=(ṙ, φ̇).

Figure 4:
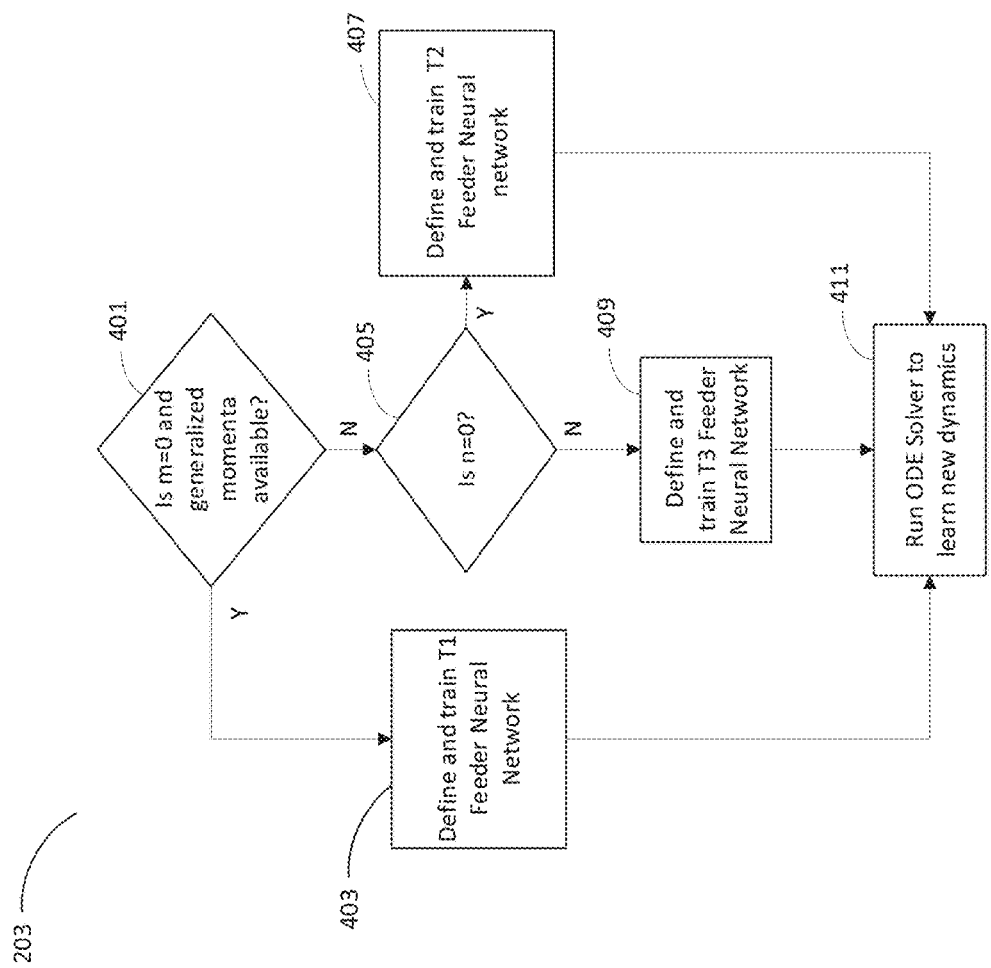
FIG. 4 shows a flowchart example of a process for determining a training network architecture for a neural ODE solver within the process of FIG. 2 in accordance with embodiments of this disclosure.
Figure 5:
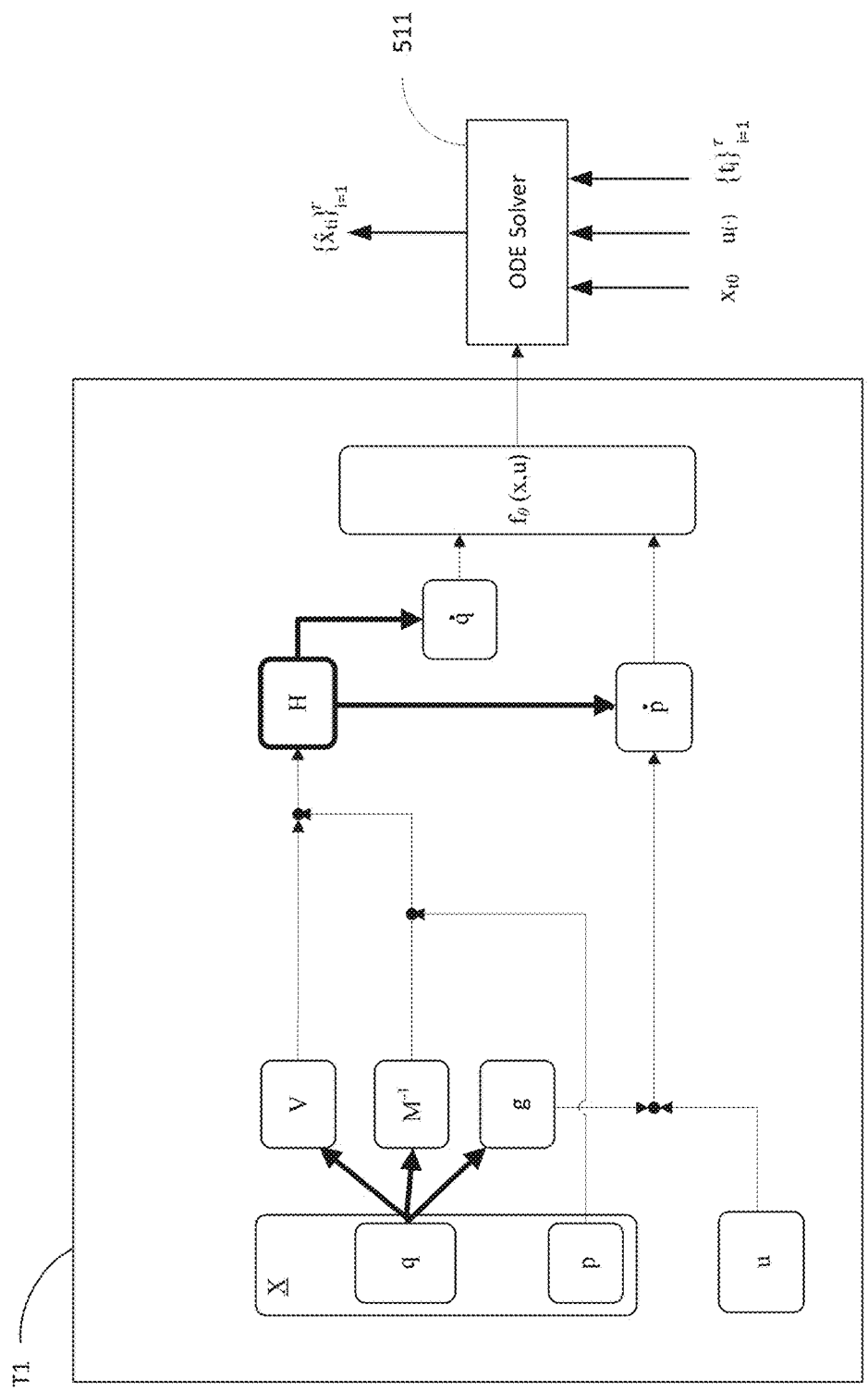
FIG. 5 shows an example of block diagram of a network architecture for training a neural ODE solver for generalized coordinate and momentum trajectory data in accordance with embodiments of this disclosure.
Figure 6:
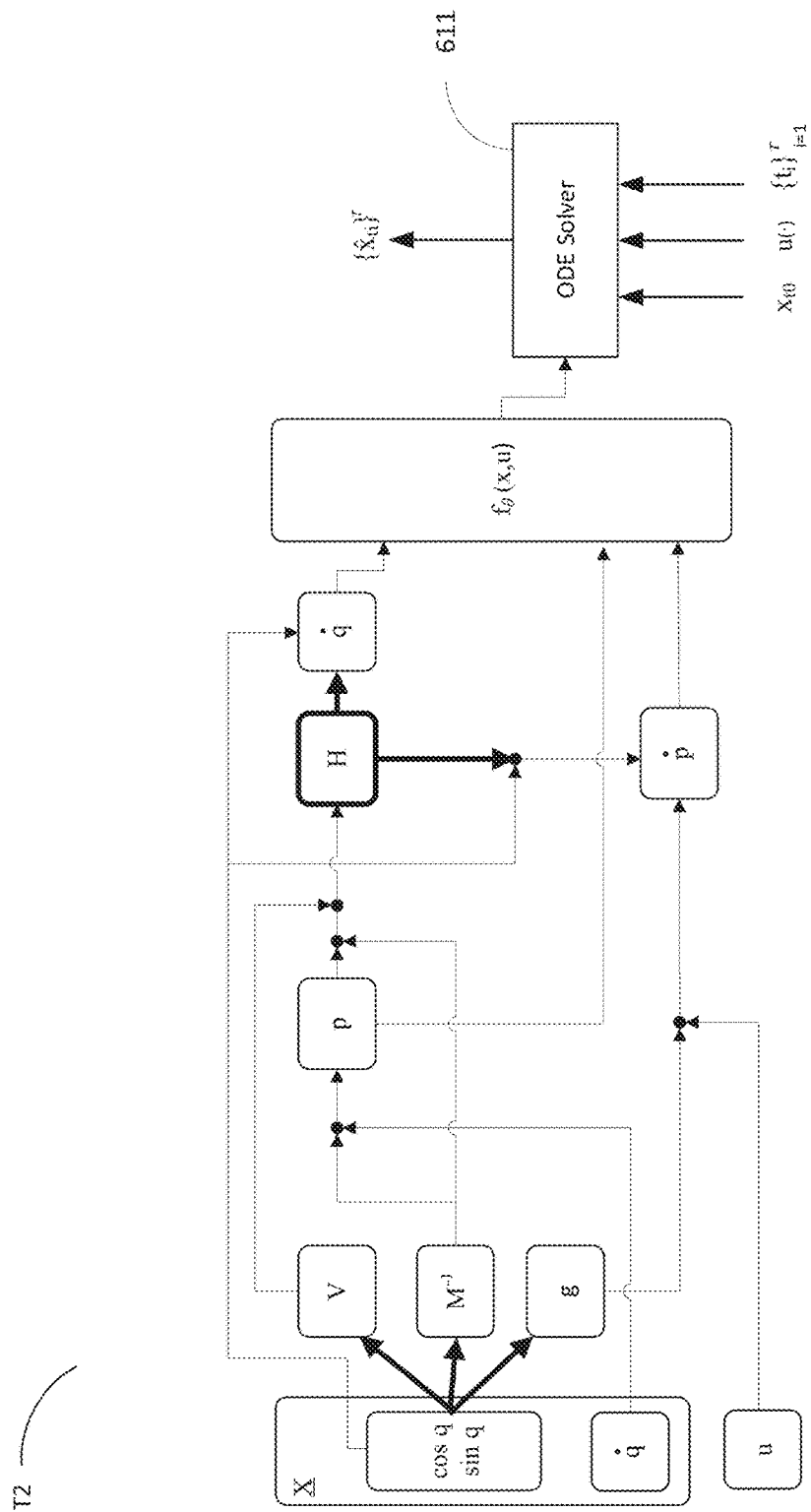
FIG. 6 shows an example of block diagram of a network architecture for training a neural ODE solver for trajectory data with only embedded angle data in accordance with embodiments of this disclosure.
Figure 7:
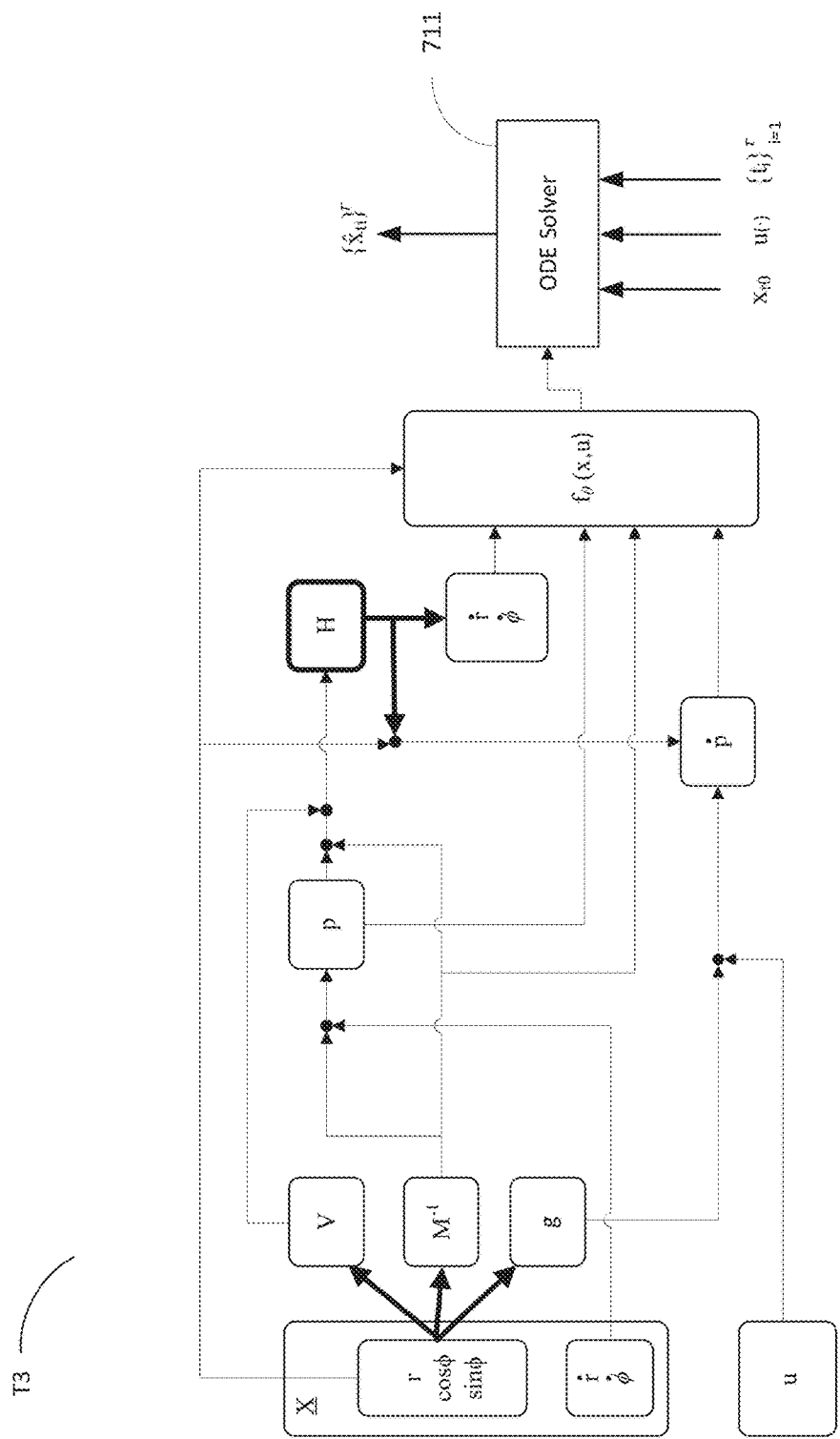
FIG. 7 shows an example of block diagram of a network architecture for training a neural ODE solver for trajectory data with both translational and rotational coordinates in hybrid space in accordance with embodiments of this disclosure.

FIG. 4 shows a flowchart example of a process for determining a training network architecture for a neural ODE solver within the process of FIG. 2 in accordance with embodiments of this disclosure. A training process 203 for Feeder Neural Network 121 includes the following steps as shown in FIG. 4. At 401, if m=0 and generalized momenta p is available, then a T1 architecture for Feeder Neural Network 121 is defined and trained at 403. An example of a T1 architecture is shown in FIG. 5. If m>0 at 401, then rotational aspects are present and a non-Euclidean model is required. At 405, if n=0, then only rotational motion is present, and a T2 architecture for Feeder Neural Network 121 is defined and trained at 407. An example of the T2 architecture is shown in FIG. 6. If at step 405, n>0, then both translational m and rotational n motions exist, and a hybrid T3 architecture for Feeder Neural Network 121 is defined and trained at 409. An example of a T3 architecture is shown in FIG. 7.

FIG. 5 shows an example of block diagram of a network architecture for training a neural ODE solver for generalized coordinate and momentum trajectory data in accordance with embodiments of this disclosure. In an embodiment, framework for T1 architecture is defined with three neural networks as function approximators and a Hamiltonian function with forced control to learn an ODE for a dynamic system having generalized coordinate and momentum trajectory data, and trained using training dataset D1 in cartesian coordinates for $\mathbb{R}$ space. Once T1 framework is defined and trained, the function f can receive new trajectory data and produce a physics based input to ODE solver 123 for synthesis of the controller. For the T1 architecture, if prior knowledge exists that the unforced dynamics of q and p is governed by Hamiltonian dynamics, the three neural networks include an inverse mass matrix $-M_{\theta_1}^{-1}(q)$, a potential energy $V_{\theta_2}(q)$ matrix and an input matrix $g_{\theta_3}(q)$ as function approximators and the ODE function for the trajectory can be represented as follows:

$$f_\theta(q, p, u) = \begin{bmatrix} \frac{\partial H_{\theta_1, \theta_2}}{\partial p} \\ -\frac{\partial H_{\theta_1, \theta_2}}{\partial q} \end{bmatrix} + \begin{bmatrix} 0 \\ g_{\theta_3}(q) \end{bmatrix} u \quad \text{Equation (5)}$$

$$H_{\theta_1, \theta_2}(q, p) = \frac{1}{2} p^T M_{\theta_1}^{-1}(q) p + V_{\theta_2}(q) \quad \text{Equation (6)}$$

The arrows feeding neural networks M, V and g indicate neural network parameterization. Automatic differentiation by Hamiltonian function H is represented as heavy output lines as shown in FIG. 5. The partial derivative in equation (5) can be solved the by automatic differentiation. By putting the defined physics-based ODE function $f_\theta$(q, p, u) into the ODE solver 511, a systematic way of adding the prior knowledge of Hamiltonian dynamics into end-to-end learning is obtained.

FIG. 6 shows an example of block diagram of a network architecture for training a neural ODE solver for trajectory data with only embedded angle data in accordance with embodiments of this disclosure. In an embodiment, having determined that the dynamical system has no translational motion (n=0), framework for T2 architecture is defined with three neural networks as function approximators and a Hamiltonian function with forced control to learn an ODE for a dynamic system having embedded angle data (rotational motion), and trained using training dataset D2 where each angle for state variables resides in the interval I-π, π) on a manifold $\mathbb{S}^1$. From a data-driven perspective, the data that respects the geometry is a 2 dimensional embedding (cos q, sin q). Furthermore, the generalized momentum data p is usually not available. Instead, the velocity is often available. For example, the observation is (cos q, sin q, q̇). From a theoretical perspective, however, the angle itself is often used, instead of the 2D embedding. Using an independent generalized coordinate system makes it easier to solve for the equations of motion. In this subsection, a data-driven standpoint is taken to develop an angle-aware method that accommodates the underlying manifold structure. It is assumed all the generalized coordinates are angles and the data is received in the form of:

$$(x_1(q), x_2(q), x_3(\dot{q}), u)_{t_0, \ldots, t_n} = (\cos q, \sin q, \dot{q}, u)_{t_0, \ldots, t_n} \quad (7)$$

As in the previous T1 architecture definition, the theoretical prior—Hamiltonian dynamics—is incorporated into the data-driven approach. The objective is to learn the dynamics of x1, x2, x3. Because $p = M(x_1, x_2)\dot{q}$, the following derivatives can be taken:

$$\dot{x}_1 = -\sin q \circ \dot{q} = -x_2 \circ \dot{q} \quad \text{Equation(8)}$$

$$\dot{x}_2 = \cos q \circ \dot{q} = -x_1 \circ \dot{q}$$

$$\dot{x}_3 = \frac{d}{dt}(M^{-1}(x_1, x_2)p) = \frac{d}{dt}(M^{-1}(x_1, x_2))p + M^{-1}(x_1, x_2)\dot{p}$$

where "∘" represents the elementwise product (i.e., Hadamard product). It is assumed that q and p evolve with the generalized Hamiltonian dynamics of Equation (1). Here the Hamiltonian H(x1, x2, p) is a function of x1, x2 and p instead of q and p.

$$\dot{q} = \frac{\partial H}{\partial p} \quad \text{Equation(9)}$$

$$\dot{p} = -\frac{\partial H}{\partial q} + g(x_1, x_2) \quad \text{Equation(10)}$$

$$u = -\frac{\partial x_1}{\partial q}\frac{\partial H}{\partial x_1} - \frac{\partial x_2}{\partial q}\frac{\partial H}{\partial x_2} + g(x_1, x_2)$$

$$u = \sin q \circ \frac{\partial H}{\partial x_1} - \cos q \circ \frac{\partial H}{\partial x_2} + g(x_1, x_2)$$

$$u = x_2 \circ \frac{\partial H}{\partial x_1} - x_1 \circ \frac{\partial H}{\partial x_2} + g(x_1, x_2)u$$

Then the right hand side of Equation (8) can be expressed as a function of state variables and control (x1, x2, x3, u), and thus, it can be fed into the ODE solver 123. For function approximators, the three neural networks are defined as: inverse mass matrix $-M_{\theta_1}^{-1}(x_1, x_2)$, potential energy matrix $V_{\theta_2}(x_1, x_2)$ and an input matrix $g_{\theta_3}(x_1, x_2)$. Substituting Equations (9) and (10) into Equation (8), the right hand side serves as the training function as follows:

$$f_\theta(x_1, x_2, x_3, u) = \begin{bmatrix} -x_2 \circ \frac{\partial H_{\theta_1, \theta_2}}{\partial p} \\ x_1 \circ \frac{\partial H_{\theta_1, \theta_2}}{\partial p} \\ \frac{d}{dt}(M_{\theta_1}^{-1}(x_1, x_2))p + M_{\theta_1}^{-1}(x_1, x_2)\left(x_2 \circ \frac{\partial H_{\theta_1, \theta_2}}{\partial x_1} - x_1 \circ \frac{\partial H_{\theta_1, \theta_2}}{\partial x_2} + g_{\theta_2}(x_1, x_2)u\right) \end{bmatrix} \quad \text{Equation(11)}$$

where $$H_{\theta_1, \theta_2}(x_1, x_2, p) = \frac{1}{2}p^T M_{\theta_1}^{-1}(x_1, x_2)p + V_{\theta_2}(x_1, x_2), \quad \text{Equation(12)}$$

$$p = M_{\theta_1}(x_1, x_2)x_3 \quad \text{Equation(13)}$$

With the ODE function $f_\theta$ computed, it can be fed into ODE solver 611 for controller synthesis. FIG. 6 shows the flow of the computation graph based on Equations (9)-(13). The arrows feeding neural networks M, V and g indicate neural network parameterization. Automatic differentiation by Hamiltonian function H is represented as heavy output lines.

FIG. 7 shows an example of block diagram of a network architecture for training a neural ODE solver for trajectory data with coordinates in hybrid space in accordance with embodiments of this disclosure. In an embodiment, framework for T3 architecture is defined with three neural networks as function approximators and a Hamiltonian function with forced control to learn an ODE for a dynamic system having trajectory data that lie on hybrid spaces $\mathbb{R}^n \times \mathbb{T}^m$, and trained using training dataset D3, where $\mathbb{T}^m$ denotes m-torus, with $\mathbb{T}^1 = \mathbb{S}^1$ and $\mathbb{T}^2 = \mathbb{S}^1 \times \mathbb{S}^1$. T3 architecture is a combination of T1 and T2 architectures. Assume the generalized coordinates are $q = (r, \phi) \in \mathbb{R}^n \times \mathbb{T}^m$ and the data comes in the form of:

$$(x_1, x_2, x_3, x_4, x_5, u)_{t_0, \ldots, t_n} = (r, \cos\phi, \sin\phi, \dot{r}, \dot{\phi}, u)_{t_0, \ldots, t_n} \quad \text{Equation (14)}$$

The three neural networks defined as function approximators for T3 are defined as: inverse mass matrix $-M_{\theta_1}^{-1}(x_1, x_2, x_3)$, potential energy matrix $V_{\theta_2}(x_1, x_2, x_3)$ and an input matrix $g_{\theta_3}(x_1, x_2, x_3)$. The momenta and Hamiltonian can be defined by:

$$p = M_{\theta_1}(x_1, x_2, x_3)\begin{bmatrix} x_4 \\ x_5 \end{bmatrix} \quad \text{Equation(15)}$$

$$H_{\theta_1, \theta_2}(x_1, x_2, x_3, p) = \quad \text{Equation(16)}$$
$$\frac{1}{2}p^T M_{\theta_1}^{-1}(x_1, x_2, x_3)p + V_{\theta_2}(x_1, x_2, x_3)$$

Using Hamiltonian dynamics, derivative estimates can be defined by:

$$\dot{q} = \begin{bmatrix} \dot{r} \\ \dot{\phi} \end{bmatrix} = \frac{\partial H_{\theta_1, \theta_2}}{\partial p} \quad \text{Equation(17)}$$

$$\dot{p} = \begin{bmatrix} -\frac{\partial H_{\theta_1, \theta_2}}{\partial x_1} \\ x_3 \circ \frac{\partial H_{\theta_1, \theta_2}}{\partial x_2} - x_2 \circ \frac{\partial H_{\theta_1, \theta_2}}{\partial x_3} \end{bmatrix} + g_{\theta_3}(x_1, x_2, x_3)u \quad \text{Equation(18)}$$

$$\begin{bmatrix} \dot{x}_1 \\ \dot{x}_2 \\ \dot{x}_3 \\ \dot{x}_4 \\ \dot{x}_5 \end{bmatrix} = \begin{bmatrix} \dot{r} \\ -x_3 \dot{\phi} \\ x_2 \dot{\phi} \\ \frac{d}{dt}(M_{\theta_1}^{-1}(x_1, x_2, x_3))p + M_{\theta_1}^{-1}(x_1, x_2, x_3)\dot{p} \end{bmatrix} = \quad \text{Equation (19)}$$

$$f_\theta(x_1, x_2, x_3, x_4, x_5, u)$$

where $\dot{r}$ and $\dot{\phi}$ come from Equation (17). Next, the ODE function $f_\theta$ is computed which can be fed into ODE solver 711. FIG. 7 shows the flow of the computation graph based on Equations (15)-(19).

For all architectures T1, T2, T3, the mass matrix M is positive definite, which ensures a positive kinetic energy with a non-zero velocity. The positive definiteness of M implies the positive definiteness of $-M_{\theta 1}^{-1}$. Thus, this constraint is imposed in the network architecture by $-M_{\theta 1}^{-1} = L_{\theta 1} L_{\theta 1}^T$, where $L_{\theta 1}$ is a lower-triangular matrix. The positive definiteness is ensured if the diagonal elements of $M_{\theta 1}^{-1}$ are positive. In practice, this can be done by adding a small constant to the diagonal elements of $M_{\theta 1}^{-}$. It not only makes $M_{\theta 1}$ invertible, but also stabilizes the training.

Figure 8:
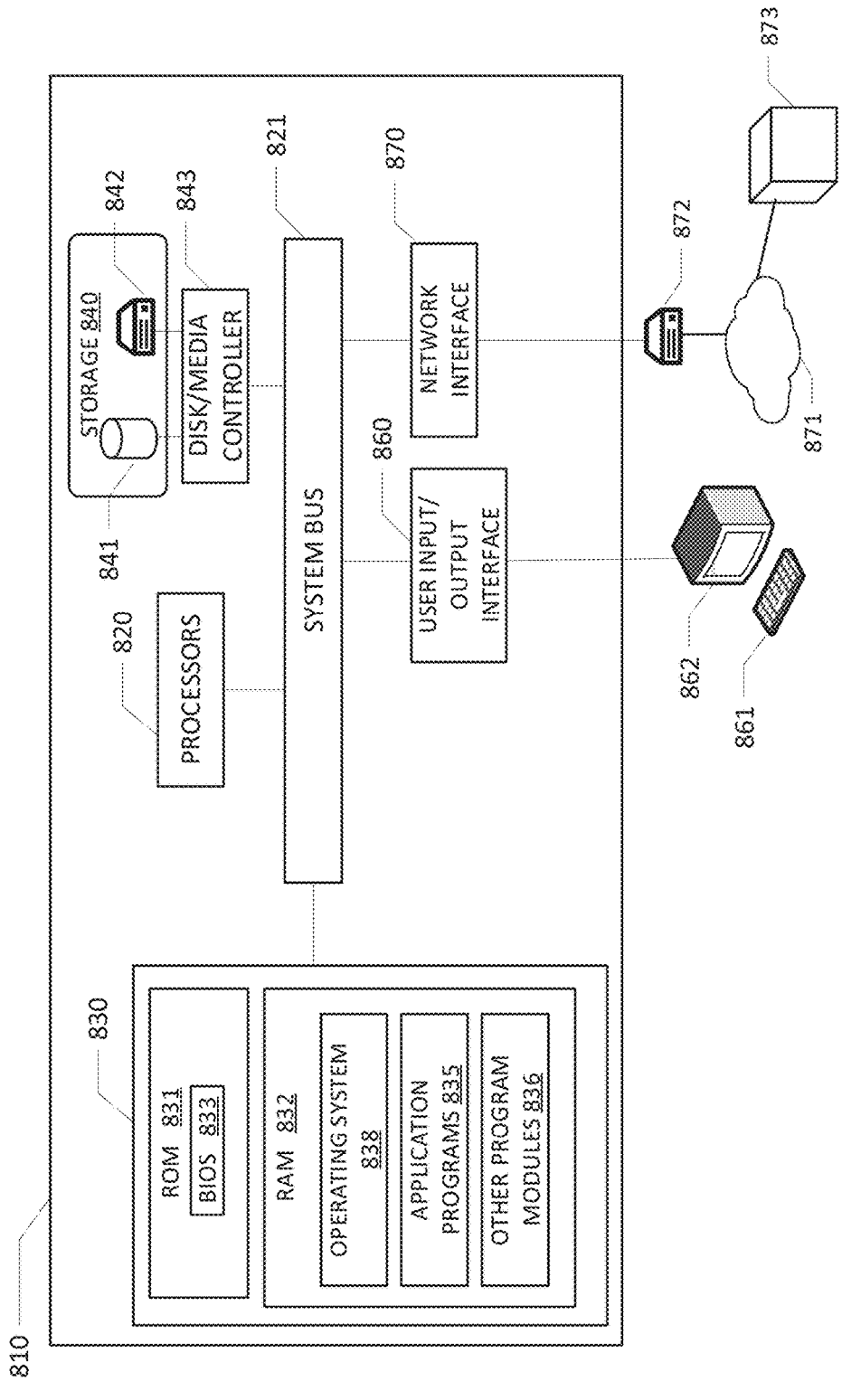
FIG. 8 illustrates an example of a computing environment within which embodiments of the disclosure may be implemented.

FIG. 8 illustrates an example of a computing environment within which embodiments of the present disclosure may be implemented. A computing environment 800 includes a computer system 810 that may include a communication mechanism such as a system bus 821 or other communication mechanism for communicating information within the computer system 810. The computer system 810 further includes one or more processors 820 coupled with the system bus 821 for processing the information. In an embodiment, computing environment 800 corresponds to a robust ML learning system, in which the computer system 810 relates to a computer described below in greater detail.

The processors 820 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 820 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 821 may include at least one of a system bus, a memory bus, an address bus, or a message bus, and may permit exchange of information (e.g., data (including computer-executable code), signaling, etc.) between various components of the computer system 810. The system bus 821 may include, without limitation, a memory bus or a memory controller, a peripheral bus, an accelerated graphics port, and so forth. The system bus 821 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 8, the computer system 810 may also include a system memory 830 coupled to the system bus 821 for storing information and instructions to be executed by processors 820. The system memory 830 may include computer readable storage media in the form of volatile and/or nonvolatile memory, such as read only memory (ROM) 831 and/or random access memory (RAM) 832. The RAM 832 may include other dynamic storage device(s) (e.g., dynamic RAM, static RAM, and synchronous DRAM). The ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in the ROM 831. RAM 832 may contain data and/or program modules that are immediately accessible to and/or presently being operated on by the processors 820. System memory 830 may additionally include, for example, operating system 834, application modules 835, and other program modules 836. Application modules 835 may include aforementioned modules described for FIG. 1 or FIG. 2 and may also include a user portal for development of the application program, allowing input parameters to be entered and modified as necessary.

The operating system 834 may be loaded into the memory 830 and may provide an interface between other application software executing on the computer system 810 and hardware resources of the computer system 810. More specifically, the operating system 834 may include a set of computer-executable instructions for managing hardware resources of the computer system 810 and for providing common services to other application programs (e.g., managing memory allocation among various application programs). In certain example embodiments, the operating system 834 may control execution of one or more of the program modules depicted as being stored in the data storage 840. The operating system 834 may include any operating system now known or which may be developed in the future including, but not limited to, any server operating system, any mainframe operating system, or any other proprietary or non-proprietary operating system.

The computer system 810 may also include a disk/media controller 843 coupled to the system bus 821 to control one or more storage devices for storing information and instructions, such as a magnetic hard disk 841 and/or a removable media drive 842 (e.g., floppy disk drive, compact disc drive, tape drive, flash drive, and/or solid state drive). Storage devices 840 may be added to the computer system 810 using an appropriate device interface (e.g., a small computer system interface (SCSI), integrated device electronics (IDE), Universal Serial Bus (USB), or FireWire). Storage devices 841, 842 may be external to the computer system 810.

The computer system 810 may include a user input/output interface module 860 to process user inputs from user input devices 861, which may comprise one or more devices such as a keyboard, touchscreen, tablet and/or a pointing device, for interacting with a computer user and providing information to the processors 820. User interface module 860 also processes system outputs to user display devices 862, (e.g., via an interactive GUI display).

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium of storage 840, such as the magnetic hard disk 841 or the removable media drive 842. The magnetic hard disk 841 and/or removable media drive 842 may contain one or more data stores and data files used by embodiments of the present disclosure. The data store 840 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processors 820 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 841 or removable media drive 842. Non-limiting examples of volatile media include dynamic memory, such as system memory 830. Non-limiting examples of transmission media include coaxial cables, copper wire, and fiber optics, including the wires that make up the system bus 821. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 800 may further include the computer system 810 operating in a networked environment using logical connections to one or more remote computers, such as remote computing device 873. The network interface 870 may enable communication, for example, with other remote devices 873 or systems and/or the storage devices 841, 842 via the network 871. Remote computing device 873 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 873). The network 871 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

It should be appreciated that the program modules, applications, computer-executable instructions, code, or the like depicted in FIG. 8 as being stored in the system memory 830 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 810, the remote device 873, and/or hosted on other computing device(s) accessible via one or more of the network(s) 871, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the computer system 810 may include alternate and/or additional hardware, software, or firmware components beyond those described or depicted without departing from the scope of the disclosure. More particularly, it should be appreciated that software, firmware, or hardware components depicted as forming part of the computer system 810 are merely illustrative and that some components may not be present or additional components may be provided in various embodiments. While various illustrative program modules have been depicted and described as software modules stored in system memory 830, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system of neural networks for synthesizing a controller, comprising:
 a processor; and
 a non-transitory memory having stored thereon modules executed by the processor, the modules comprising:
  a feeder neural network trained to estimate an ordinary differential equation (ODE) from time series training data (X) of a trajectory of a robot having a combination of embedded angular data and generalized coordinate and momentum data, configured to learn dynamics of a physical system that includes the robot by encoding a generalization of a Hamiltonian representation of the dynamics using a constant external control term (u) for driving parameter learning in the feeder neural network; and
  a neural ordinary differential equation (ODE) solver configured to receive the estimate of the ODE from the feeder neural network, and to synthesize a controller to control the system to track a reference configuration, wherein the controller is configured to control the robot based on the reference configuration that is tracked.

2. The system of claim 1, wherein the feeder neural network comprises function approximator neural networks, comprising:
- a first neural network to parameterize an inverse mass matrix for a first term in the Hamiltonian representation;
- a second neural network to parameterize a potential energy matrix for a second term in the Hamiltonian representation; and
- a third neural network to parameterize an input matrix as a scaler term for the external control term (u).

3. The system of claim 1, wherein feeder neural network includes a partial derivative operation on the Hamiltonian representation solved by automatic differentiation.

4. The system of claim 1, wherein training data is generated based on whether translational degrees of freedom and rotational degrees of freedom are present in the dynamical system and whether generalized momenta data is available.

5. The system of claim 1, wherein the feeder neural network architecture is defined based on whether translational degrees of freedom and rotational degrees of freedom are present in the dynamical system and whether generalized momenta data is available.

6. The system of claim 1, wherein the feeder neural network infers energy parameters from the learned dynamics and incorporates energy shaping by deriving a potential energy shaping function such that a desired Hamiltonian has a minimum at a desired reference configuration to ensure lowest energy in the system at the reference configuration.

7. A method for synthesizing a controller, comprising:
- using a feeder neural network trained to estimate an ordinary differential equation (ODE) from time series training data (X) of a trajectory of a robot having a combination of embedded angular data and generalized coordinate and momentum data;
- learning dynamics of a physical system that includes the robot by encoding a generalization of a Hamiltonian representation of the dynamics using a constant external control term (u) for driving parameter learning in the feeder neural network;
- receiving the estimate of the ODE from the feeder neural network; and
- synthesizing a controller to control the system to track a reference configuration; and
- controlling the robot based on the reference configuration that is tracked.

8. The method of claim 7, wherein the feeder neural network comprises function approximator neural networks, further comprising:
- using a first neural network to parameterize an inverse mass matrix for a first term in the Hamiltonian representation;
- using a second neural network to parameterize a potential energy matrix for a second term in the Hamiltonian representation; and
- using a third neural network to parameterize an input matrix as a scaler term for the external control term (u).

9. The method of claim 7, wherein feeder neural network includes a partial derivative operation on the Hamiltonian representation solved by automatic differentiation.

10. The method of claim 7, further comprising:
- generating training data based on whether translational degrees of freedom and rotational degrees of freedom are present in the dynamical system and whether generalized momenta data is available.

11. The method of claim 7, further comprising:
- defining the feeder neural network architecture based on whether translational degrees of freedom and rotational degrees of freedom are present in the dynamical system and whether generalized momenta data is available.

12. The method of claim 7, further comprising:
- inferring energy parameters from the learned dynamics and incorporating energy shaping by deriving a potential energy shaping function such that a desired Hamiltonian has a minimum at a desired reference configuration to ensure lowest energy in the system at the reference configuration.

* * * * *